United States Patent
Goel et al.

(10) Patent No.: US 9,982,930 B2
(45) Date of Patent: May 29, 2018

(54) SYSTEM FOR CONTROLLING OPERATION OF AN HVAC SYSTEM

(71) Applicant: Lennox Industries Inc., Richardson, TX (US)

(72) Inventors: Rakesh Goel, Irving, TX (US); Eric Berg, The Colony, TX (US); Jon Douglas, Lewisville, TX (US)

(73) Assignee: Lennox Industries Inc., Richardson, TX (US)

( * ) Notice: Subject to any disclaimer, the term of this patent is extended or adjusted under 35 U.S.C. 154(b) by 535 days.

(21) Appl. No.: 14/173,686

(22) Filed: Feb. 5, 2014

(65) Prior Publication Data
US 2015/0219377 A1    Aug. 6, 2015

(51) Int. Cl.
*F25B 49/02*    (2006.01)

(52) U.S. Cl.
CPC ...... *F25B 49/025* (2013.01); *F25B 2600/021* (2013.01); *F25B 2700/21151* (2013.01); *F25B 2700/21152* (2013.01); *F25B 2700/21163* (2013.01); *Y02B 30/741* (2013.01)

(58) Field of Classification Search
CPC .......... F25B 49/025; F25B 2700/21152; F25B 2600/021; F25B 2700/21163; F25B 2700/21151; Y02B 30/741
See application file for complete search history.

(56) References Cited

U.S. PATENT DOCUMENTS

| | | | |
|---|---|---|---|
| 2003/0078742 A1* | 4/2003 | VanderZee | G01R 21/006 702/60 |
| 2003/0097849 A1* | 5/2003 | Taguchi | B60H 1/3225 62/133 |
| 2004/0261441 A1* | 12/2004 | Turner | F25B 13/00 62/324.1 |
| 2006/0238388 A1* | 10/2006 | Jayanth | F04B 49/10 341/51 |
| 2009/0090118 A1* | 4/2009 | Pham | F04B 39/06 62/228.5 |
| 2009/0092502 A1* | 4/2009 | Marcinkiewicz | F04B 49/06 417/63 |
| 2009/0094997 A1* | 4/2009 | McSweeney | F25B 49/025 62/126 |
| 2009/0095002 A1* | 4/2009 | McSweeney | F25B 49/022 62/216 |
| 2009/0119036 A1* | 5/2009 | Jayanth | F04B 49/065 702/60 |
| 2009/0225479 A1* | 9/2009 | Jayanth | G01R 19/10 361/30 |
| 2011/0031911 A1* | 2/2011 | Marcinkiewicz | H02M 1/4225 318/400.3 |

(Continued)

FOREIGN PATENT DOCUMENTS

JP    11223183 A  *  8/1999
WO    WO 2013099147 A1 *  7/2013  ............ F25B 49/005

*Primary Examiner* — Kun Kai Ma
(74) *Attorney, Agent, or Firm* — Baker Botts L.L.P.

(57) ABSTRACT

The present invention provides for a control system for a compressor assembly of an heating, ventilation, and air conditioning (HVAC) system. A control assembly comprises a controller for varying the capacity of a compressor unit of the compressor assembly. The controller determines a first pressure of the compressor unit based on a first operating state of the compressor unit.

17 Claims, 7 Drawing Sheets

(56) References Cited

U.S. PATENT DOCUMENTS

| | | | | |
|---|---|---|---|---|
| 2011/0083454 A1* | 4/2011 | Kopko | ............... | F25B 49/027 |
| | | | | 62/115 |
| 2014/0084836 A1* | 3/2014 | Pham | ............... | G01R 31/343 |
| | | | | 318/490 |
| 2014/0123693 A1* | 5/2014 | Shimazu | ............... | F25B 49/00 |
| | | | | 62/115 |
| 2014/0232308 A1* | 8/2014 | Watanabe | ............. | H02P 27/047 |
| | | | | 318/400.02 |
| 2015/0027138 A1* | 1/2015 | Schuster | ............... | F25B 49/02 |
| | | | | 62/56 |

\* cited by examiner

SYSTEM FOR CONTROLLING OPERATION OF AN HVAC SYSTEM

BACKGROUND OF THE INVENTION

Field of the Invention

The present invention relates to control systems used in heating, ventilation, and air conditioning (HVAC) systems and, more particularly, to a system for controlling operation of an HVAC system.

A compressor in a heat pump, such as a heating, ventilation, and air conditioning (HVAC) system, allows for the exchange of thermal energy to heat or cool air in an enclosed space, such as in a home or a business. Some compressors in HVAC systems are driven by an inverter, which is configured to vary the amount of heating or cooling output by the HVAC system.

The HVAC system uses data from the environment, such as the outdoor ambient temperature and the indoor ambient temperature, to monitor the conditions in a home or business. Based on such data, the HVAC system, through the inverter, can adjust the power level of the compressor. For example, the compressor may operate at a decreased power level once a desired inside temperature is reached.

The ability to adjust the power level of the compressor allows the HVAC system to operate more efficiently than HVAC systems that do not utilize an inverter. For example, a compressor driven by an inverter cycles from on to off less often than a compressor that is not driven by an inverter. The compressor driven by an inverter further operates at maximum capacity for shorter intervals. HVAC systems utilizing compressors driven by inverters incur less in energy costs and prolong the operating life of the compressor.

Compressors, both those driven by inverters and those that are not, require inspection to troubleshoot repairs and to prevent break-downs. The suction pressure and the discharge pressure of the compressor are useful parameters when determining whether there has been or will be a problem with the compressor. For example, a discharge pressure trending high may be an indicator that a high pressure switch will trip causing the compressor to become inoperable until it is serviced.

Some known HVAC systems employ pressure transducers to predict suction and discharge pressure. Pressure transducers add costs and complexity to the HVAC systems. What is needed are improved systems, devices, and methods for predicting the suction pressure and the discharge pressure of a compressor in an HVAC system.

SUMMARY

The present invention provides for a control system for a compressor assembly of a heating, ventilation, and air conditioning (HVAC) system. A controller determines a first pressure of the compressor unit based on the first operating state of the compressor unit.

BRIEF DESCRIPTION OF THE DRAWINGS

For a more complete understanding of the present invention and the advantages thereof, reference is now made to the following Detailed Description taken in conjunction with the accompanying drawings, in which.

DETAILED DESCRIPTION

In the following discussion, numerous specific details are set forth to provide a thorough understanding of the present invention. However, those skilled in the art will appreciate that the present invention may be practiced without such specific details. In other instances, well-known elements have been illustrated in schematic or block diagram form in order not to obscure the present invention in unnecessary detail. Additionally, for the most part, details concerning well-known features and elements have been omitted inasmuch as such details are not considered necessary to obtain a complete understanding of the present invention, and are considered to be within the understanding of persons of ordinary skill in the relevant art.

Figure 1:
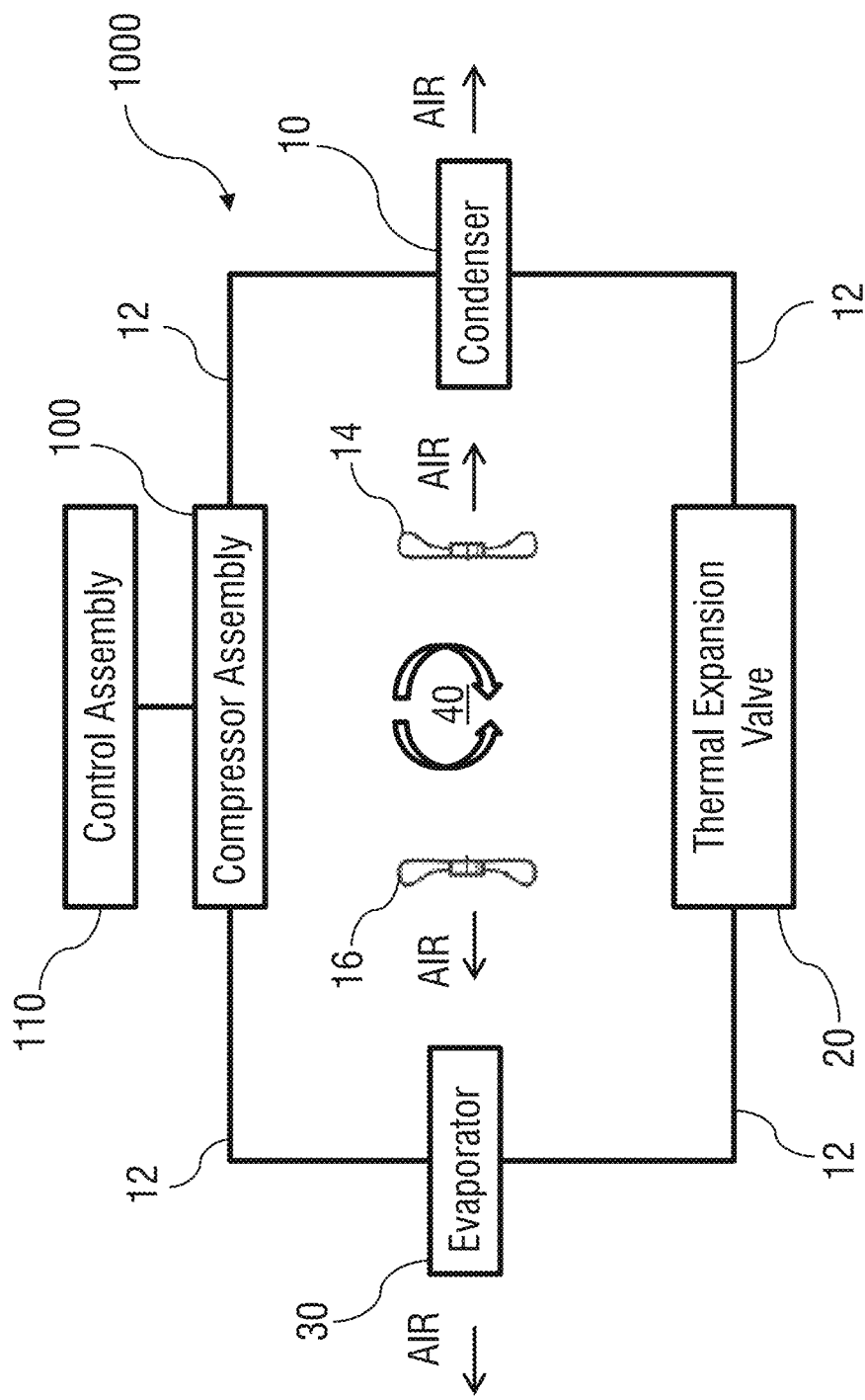
FIG. 1 illustrates an HVAC system.

Referring to FIG. 1, a compressor assembly 100 may be configured to operate in a heat pump, such as an HVAC system 1000. The HVAC system 1000 may comprise a compressor assembly 100 operationally connected by flow lines 12 to a condenser 10 with a first blower 14, a thermal expansion valve 20, and an evaporator 30 with a second blower 16. The HVAC system 1000 may be configured for refrigeration, cooling, and heating in an operation cycle 40 for maintaining a desired temperature profile in an enclosed space, such as a home or business.

A control assembly 110 may be operationally connected with the compressor assembly 100 and configured to modulate the cooling capacity of the compressor assembly 100 in a refrigeration, air conditioning, and heating system. In some embodiments, the control assembly 110 may modulate cooling capacity of the compressor assembly 100 by changing an operation condition, via an operating signal, of the compressor unit 102 operating in the compressor assembly 100. For example, an operating signal may comprise a control signal changing the speed of motors of the compressor unit 102. In other embodiments, an operating signal may also comprise a diagnostic signal, or sending operation data to a display, to a storage, or to a third party via a wired or wireless connection.

Figure 2:
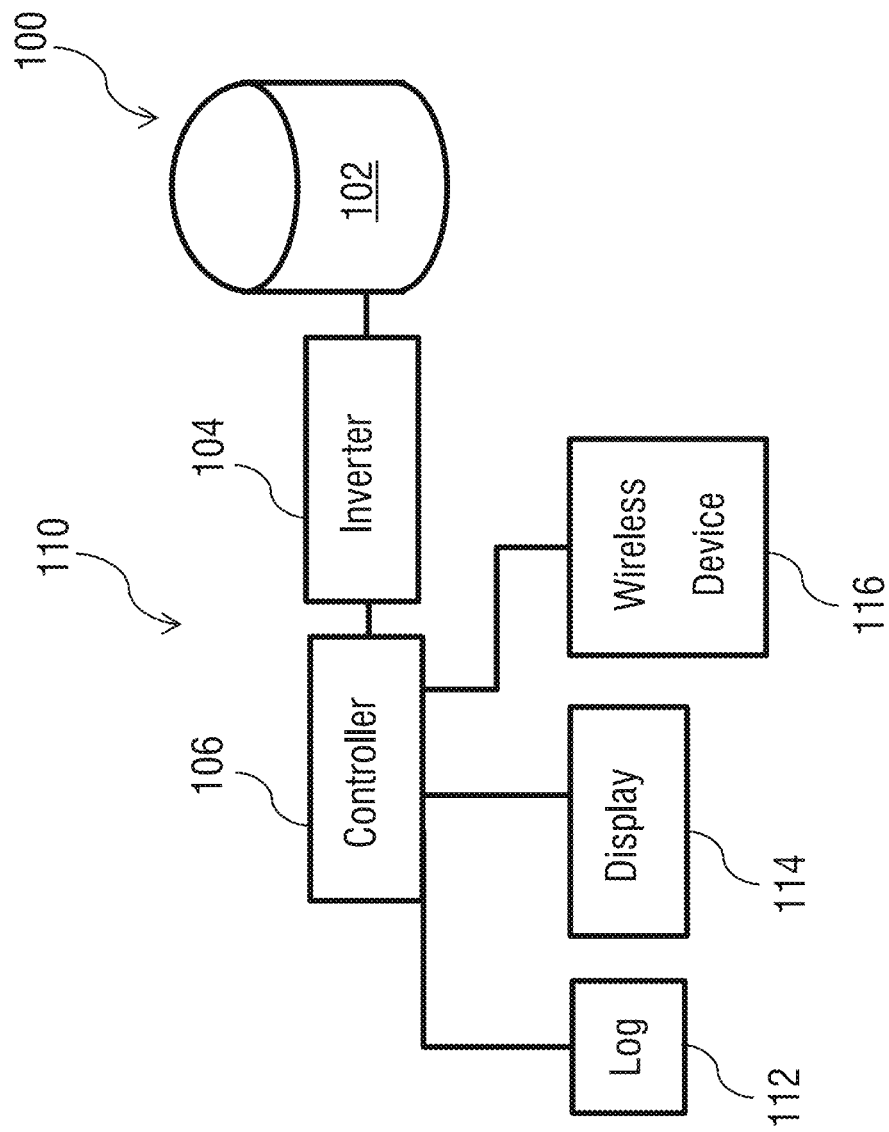
FIG. 2 illustrates a compressor assembly and a control assembly.

Referring to FIG. 2, the compressor assembly 100 may comprise one or more compressor units 102. The control assembly 110 may be operationally connected to the first compressor unit 102. In some embodiments, the control assembly 110 may adjust the speed of the motor of a compressor unit 102 to adjust the cooling capacity of the compressor assembly 100.

The control assembly 110 may further comprise an electrical power converter, such as a first inverter 104 and an electronic first controller 106. The first inverter 104 may be operationally connected to the first compressor unit 102 and configured to adjust the input voltage delivered to the first compressor unit 102. The first inverter 104 may be operationally connected to the first controller 106 configured to receive and send operation signals for operation of the HVAC system 1000.

In other embodiments, the cooling capacity of the compressor assembly 100 may be adjusted without use of an inverter. It will be understood that the first controller 106 may be configured to adjust cooling capacity without use of the inverter 104. In those embodiments, the controller 106 may be configured to utilize other known variable-speed solutions.

The first inverter 104 may comprise an electronic power factor feature (PF feature) programmed into the logic of a processor of the first controller 106. In other embodiments, the power factor feature logic may be programmed into the inverter 104. When the PF feature is enabled, in an "ON" state, the power factor of the inverter is raised compared to when the PF feature is disabled, in an "OFF" state. The power factor of the first inverter 104 is the ratio of real power delivered to the first compressor unit 102 to actual power consumed by the compressor unit 102.

Figure 3:
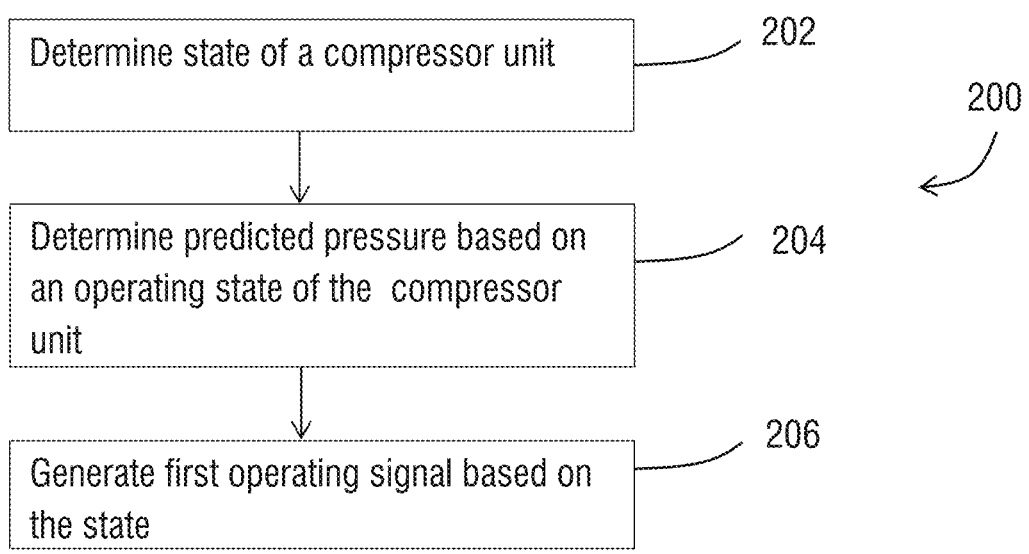
FIG. 3 shows a flow chart of a controller configured to operate a compressor assembly.

Referring to FIG. 3, laboratory tests were conducted to determine the power factor for an outdoor compressor unit having an inverter-driven variable capacity, for example a 3-ton capacity. The characteristics of the inverter itself determine the power factor. The inverter design determines the power factor when the active power factor correction is off. When the power factor correction is on, the inverter controls the power factor. It will be understood by persons of ordinary skill that other types of compressors having different capacities and inverters having different operating characteristics may be utilized in the systems and methods disclosed here.

Based on the tests, the power factor ratio was determined at 0.99 when the PF feature is ON. The power factor ratio was determined to be 0.6 when the PF feature is OFF. It will be understood by persons of ordinary skill in the art that the power factor ratio is compressor specific, and may vary depending on the type of compressor in the compressor assembly, and whether the compressor is driven by an inverter with a PF feature.

The first controller 106 may be configured to determine a parameter of the HVAC system 1000 based on other known parameters of the operating state of the compressor unit 102. In one embodiment, the first controller 106 may predict a pressure characterizing operation of the compressor unit 102. Based on the operating state of the compressor unit 102, the first controller 106 may determine the suction pressure or discharge pressure. The operating state of the compressor unit 102 may comprise known values of the power factor ratio and other inputs readily accessible or calculable within the control assembly 110, including data regarding operation of the compressor unit 102 and environmental data taken from the inverter 104. In other embodiments, the first controller 106 may be configured to determine other parameters of the HVAC system 1000 based on the operating state of the compressor unit 102, for example, liquid pressure, evaporator pressure, condensing temperature, or evaporating temperature and the like.

A processor of the first controller 106 may be pre-programmed with a first model characterizing the operation of the compressor unit 102. The first model may be used to determine one or more parameters of the HVAC system 1000, for example suction pressure or discharge pressure of the compressor unit 102.

Using at least the power factor ratio (PFR), the input voltage (IV) and input current (IC), the compressor power (CP) may be calculated by a processor of the first controller 106, according to the following formula:

$$CP = IV \times IC \times PFR$$

The first controller 106 may also comprise other useful data relating to the environment where the HVAC system 1000 is operating within and relating to characteristics of the HVAC system 1000. The other useful data may be readily accessible from sensors in the HVAC system 1000, including from the inverter 104, and stored in a controller memory or readily calculable by the controller processor. In some embodiments, this other useful data may comprise outdoor ambient temperature, indoor ambient temperature, the indoor airflow rate (measured in cubic feet per minute (CFM)), and the indoor supply air temperature. In other embodiments, additional data from the HVAC system 1000 or the environment may be utilized, depending on the sensors available in the HVAC system 1000, and including but not limited to discharge temperature, liquid temperature, and suction temperature.

The first model may be determined by testing the compressor unit 102 in the laboratory to characterize operation of the compressor unit. The first model may be represented in a polynomial expression as a function of variables of a given HVAC system, for example see Table 1 below.

Figure 5:
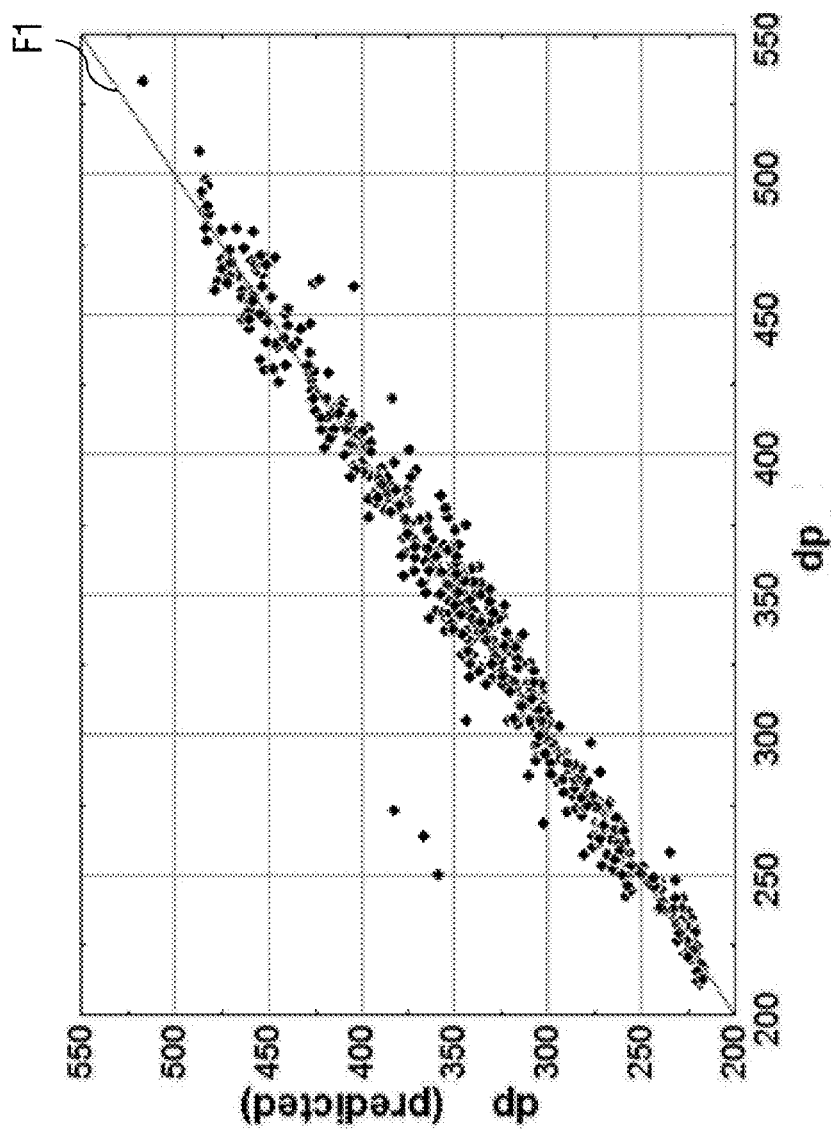
FIG. 5 shows a first graph of laboratory measurements of discharge pressure of compressor unit.
Figure 6A:
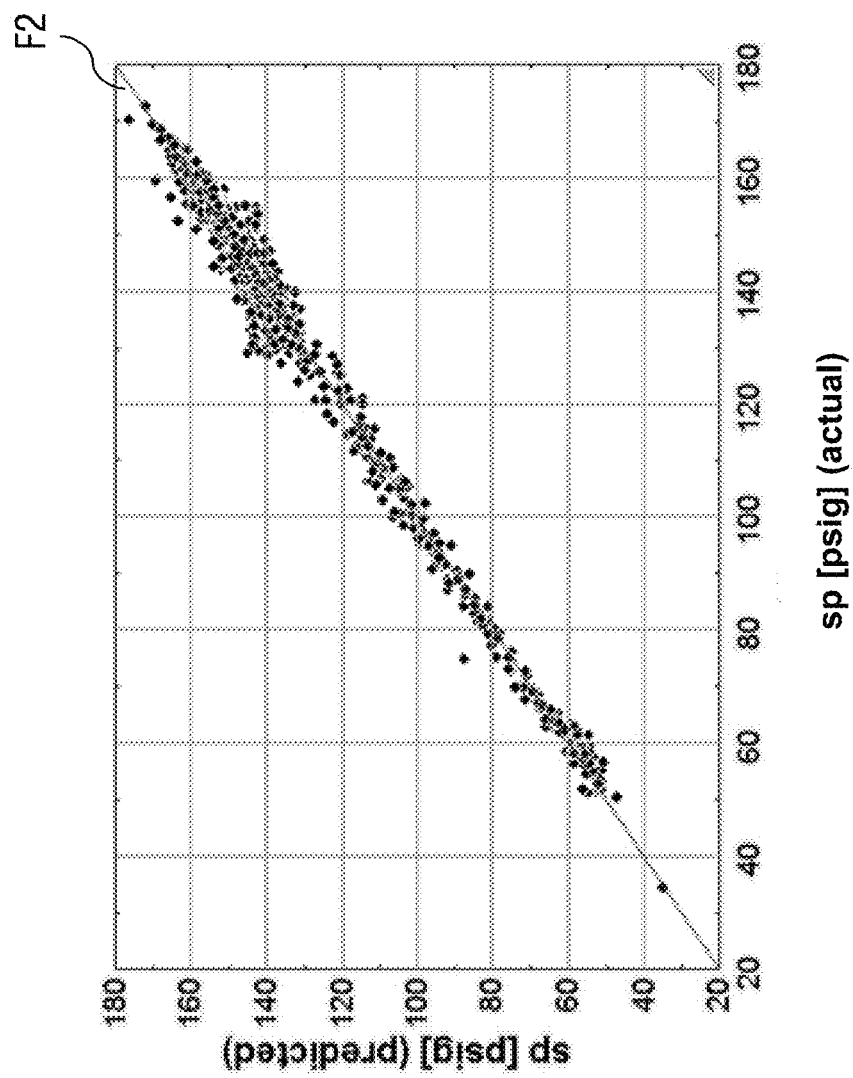
FIGS. 6A and 6B show first graph and a second graph of laboratory measurements of suction pressure of compressor unit.
Figure 6B:
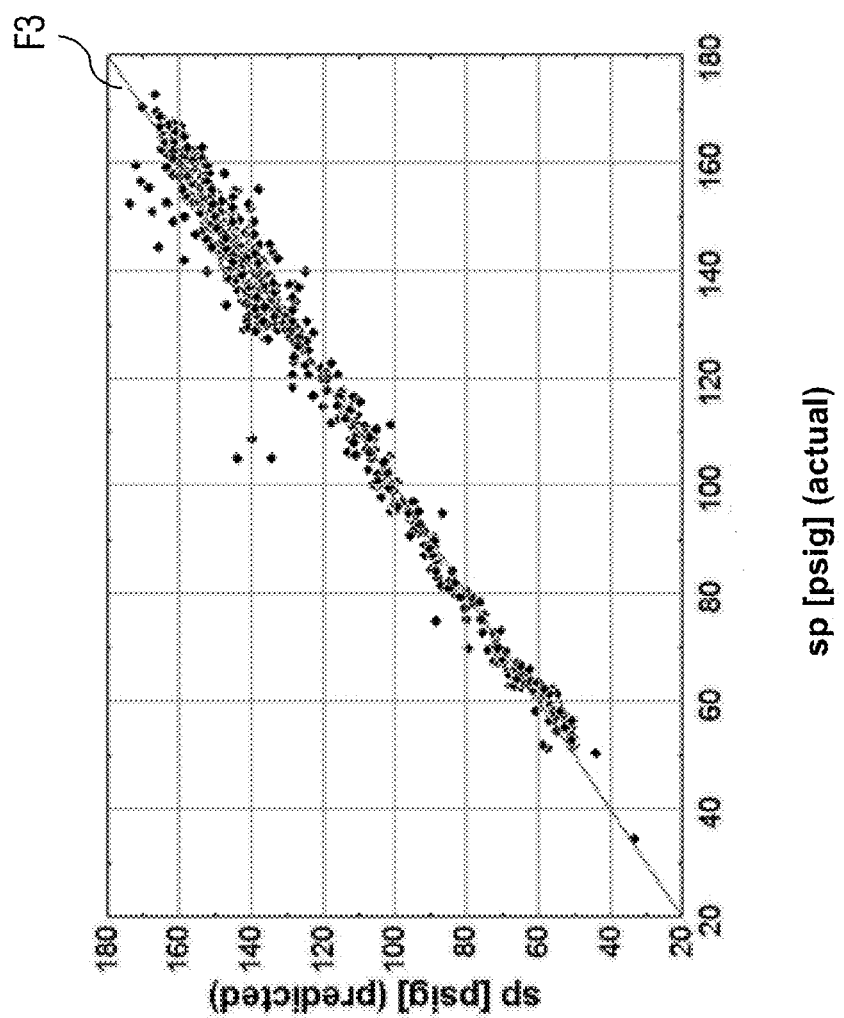

Coefficients of each polynomial term may be derived by testing one or more HVAC systems over a wide range of operating states and collecting the relevant data at those conditions. Linear regression, or a similar method, may be used to create a model from that data. As shown in FIGS. 5, 6A and 6B, in laboratory tests of the compressor units having variable capacities, a linear regression tool was used at standard test conditions, charge curves, and at various indoor airflow rates to determine the suction and discharge pressure of the compressor unit 102. In some embodiments, the predicted suction pressure in the SP Polynomial and the predicted discharge pressure in the DP Polynomial may be a function of outdoor temperature, indoor temperature, indoor airflow rate (measured in cubic feet per minute (CFM)), compressor power (measured in watts), and indoor leaving temperature. The following Table 1 provides a reference of abbreviations of variables used in polynomials and tables disclosed here:

TABLE 1

| Abbreviation | Variable |
|---|---|
| CFM | indoor airflow rate |
| OD | outdoor temperature |
| ID | indoor temperature |
| ID_EXIT | indoor leaving temperature |
| COMP_W | compressor power |

Based on laboratory tests, the following polynomial (SP Polynomial) characterizes suction pressure:

SP=S0+S1*CFM+S2*CFM2+S3*OD+S4*OD^2+ S5*ID+S6*ID^2+S7*ID E XIT+S8*ID_EXIT^2+ S9*COMP_W+S10*COMP_W^2+S11*CFM*OD+ S12*CFM*ID+S13*CFM*ID_EXIT+ S14*CFM*COMP_W+S15*OD*ID+S16*OD*ID_EXIT+ S17*OD*COMP_W+S18*ID*ID_EXIT+ S19*ID*COMP_W+S20*ID_EXIT*COMP_W (Function F3 shown in FIG. 6B)

Or in an alternate expressions of the same polynomial:
SP=S0+(S1)(CFM)+(S2)(CFM$^2$)+(S3)(OD)+(S4)(OD$^2$)+ (S5)(ID)+(S6)(ID$^2$)+(S7)(ID_EXIT)+(S8)(ID_EXIT$^2$)+ (S9)(COMP_W)+(S10)(COMP_W$^2$)+(S11)(CFM)(OD)+ (S12)(CFM)(ID)+(S13)(CFM)(ID_EXIT)+(S14)(CFM) (COMP_W)+(S15)(OD)(ID)+(S16)(OD)(ID_EXIT)+(S17) (OD)(COMP_W)+(S18)(ID)(ID_EXIT)+(S19)(ID) (COMP_W)+(S20)(ID_EXIT)(COMP_W)

The following polynomial (DP Polynomial) characterizes discharge pressure:

$DP=D0+D1*CFM+D2*CFM^2+D3*OD+D4*OD^2+D5*ID+D6*ID^2+D7*ID\_EXIT+D8*ID\_EXIT^2+D9*COMP\_W+D10*COMP\_W^2+D11*CFM*OD+D12*CFM*ID+D13*CFM*ID\_EXIT+D14*CFM*COMP\_W+D15*OD*ID+D16*OD*ID\_EXIT+D17*OD*COMP\_W+D18*ID*ID\_EXIT+D19*ID*COMP\_W+D20*ID\_EXIT*COMP\_W$

Or in an alternate expressions of the same polynomial:

$DP=D0+(D1)(CFM)+(D2)(CFM^2)+(D3)(OD)+(D4)(OD^2)+(D5)(ID)+(D6)(ID^2)+(D7)(ID\_EXIT)+(D8)(ID\_EXIT^2)+(D9)(COMP\_W)+(D10))COMP\_W^2)+(D11)(CFM)(OD)+(D12)(CFM)(ID)+(D13)(CFM)(ID\_EXIT)+(D14)(CFM)(COMP\_W)+(D15)(OD)(ID)+(D16)(OD)(ID\_EXIT)+(D17)(OD)(COMP\_W)+(D18)(ID)(ID\_EXIT)+(D19)(ID)(COMP\_W)+(D20)(ID\_EXIT)(COMP\_W)$

In other embodiments, the predicted suction pressure in the SP Polynomial and the predicted discharge pressure in the DP Polynomial is a function of outdoor temperature, indoor temperature, indoor airflow rate (measured in cubic feet per minute (CFM)), and compressor power (measured in watts). In the truncated polynomials, the indoor supply air temperature term (ID_EXIT) of the SP Polynomial and the DP Polynomial may be left out, as shown below:

Truncated SP Polynomial:

$Truncated\_SP=S0+S1*CFM+S2*CFM^2+S3*OD+S4*OD^2+S5*ID+S6*ID^2+S7*COMP\_W+S8*COMP\_W^2+S9*CFM*OD+S10*CFM*ID+S11*CFM*COMP\_W+S12*OD*ID+S13*OD*COMP\_W+S14*ID*COMP\_W$ (Function F2 shown in FIG. 6A)

Or in an alternate expressions of the same polynomial:

$Truncated\_SP=(S0)+(S1)(CFM)+(S2)(CFM^2)+(S3)(OD)+(S4)(OD^2)+(S5)(ID)+(S6)(ID^2)+(S7)(COMP\_W)+(S8)(COMP\_W^2)+(S9)(CFM)(OD)+(S10)(CFM)(ID)+(S11)(CFM)(COMP\_W)+(S12)(OD)(ID)+(S13)(OD)(COMP\_W)+(S14)(ID)(COMP\_W)$ (Function F2 shown in FIG. 6A)

Truncated DP Polynomial:

$Truncated\_DP=D0+D1*CFM+D2*CFM^2+D3*OD+D4*OD^2+D5*ID+D6*ID^2+D7*COMP\_W+D8*COMP\_W^2+D9*CFM*OD+D10*CFM*ID+D11*CFM*COMP\_W+D12*OD*ID+D13*OD*COMP\_W+D14*ID*COMP\_W$ (Function F1 shown in FIG. 5)

Or in an alternate expressions of the same polynomial:

$Truncated\_DP=(D0)+(D1)(CFM)+(D2)(CFM^2)+(D3)(OD)+(D4)(OD^2)+(D5)(ID)+(D6)(ID^2)+(D7)(COMP\_W)+(D8)(COMP\_W^2)+(D9)(CFM)(OD)+(D10)(CFM)(ID)+(D11)(CFM)(COMP\_W)+(D12)(OD)(ID)+(D13)(OD)(COMP\_W)+(D14)(ID)(COMP\_W)$ (Function F1 shown in FIG. 5)

Figure 4:
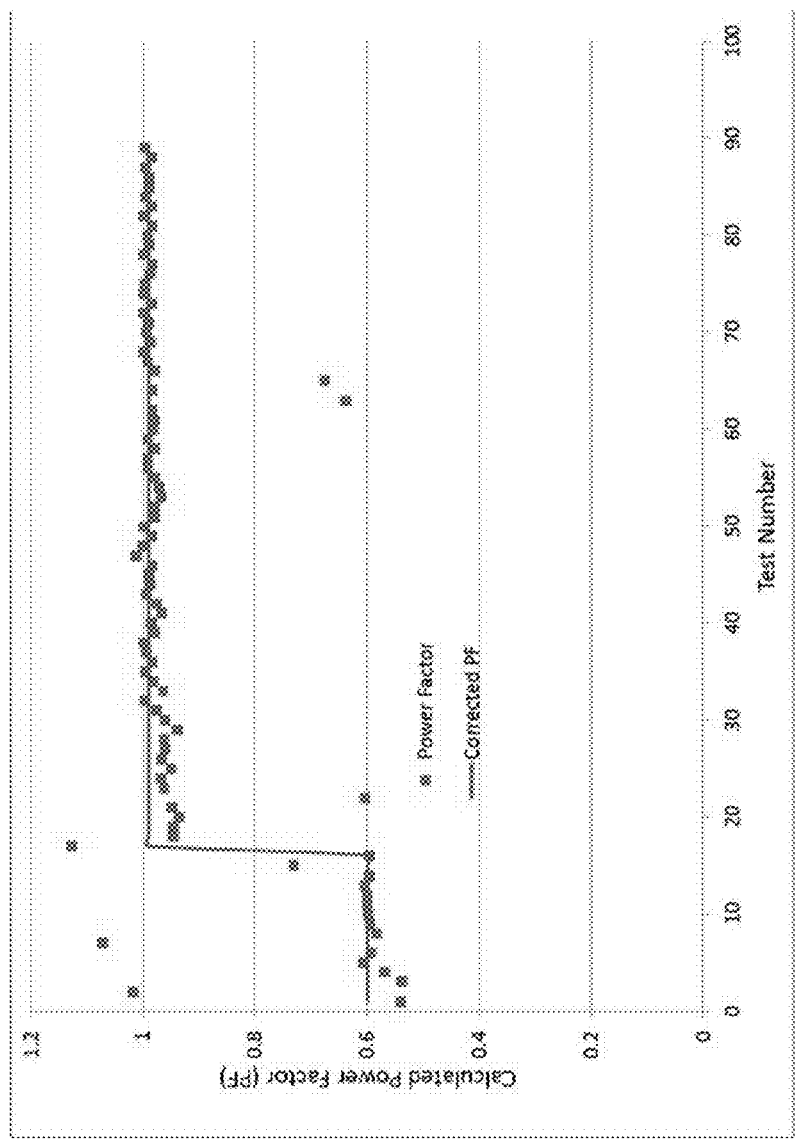
FIG. 4 shows a graph of laboratory measurements of a power factor feature of a compressor unit.

The characterizations of discharge and suction pressure disclosed in FIGS. 5, 6A and 6B are one embodiment of the systems and methods disclosed in FIGS. 1, 2, and 4. It will be understood by persons of ordinary skill in the art that the coefficients of each term and constants are specific to each HVAC system and may vary depending on the operating characteristics of the HVAC system, including but not limited to the capacity of the compressor unit in the HVAC system, the power factor ratio, and other known characteristics.

Referring to FIG. 5, the coefficient of determination ($R^2$) between the Function F1 of the Truncated DP Polynomial and the test data is about 97%. Referring to FIG. 6A, the coefficient of determination between the Function F2 of the Truncated SP Polynomial and the test data is about 97.97%. Referring to FIG. 6B, the SP Polynomial adds a term for indoor supply air temperature, which improves the fit of the predicted data (Function F3) to the actual data to a coefficient of determination of 98.81%. Additional parameters of the operating state of the compressor unit 102 may be added to further improve the fit of predicted pressure data to actual pressure data, including but not limited to discharge temperature, liquid temperature, and suction temperature and depending on the sensors available in the HVAC system 1000.

Referring to FIG. 3, the control assembly 110 may be utilized to perform one or more methods to support operation of the HVAC system 1000. In a first step 202 of a first method 200, the first controller 106 may be configured to determine one or more parameters of a first operating state of the compressor unit 102 at a first time of operation. The first operating state may comprise a set of parameters that characterize operation of the compressor unit 102 at the first time, such as the power factor ratio (PFR), the input voltage (IV) and input current (IC). The compressor power (CP) may be calculated from parameters of the first operating state.

In a second step 204, the first controller 106 may be configured to determine a first predicted pressure characterizing operation of the compressor unit 102 in the first state and at the first time. In some embodiments, the controller 106 may calculate the first predicted pressure. The calculation of the first predicted pressure may be based on one or more parameters of the first operating state. For example, the first predicted pressure may be a discharge pressure calculated from the DP Polynomial or the First Truncated DP Polynomial, which each are a function of CP, among other variables. The use of one the DP Polynomial or the First Truncated DP Polynomial may depend on the amount of useful data available in the first controller 106 to use as variables in each formula and may also depend on the desired level of accuracy (i.e. $R^2$).

In other embodiments, the first predicted pressure may be a suction pressure calculated from the SP Polynomial or the First Truncated SP Polynomial, which each are a function of CP, among other variables. The use of one the SP Polynomial or the First Truncated SP Polynomial may depend on the amount of useful data available in the first controller 106 to use as variables in each formula and may also depend on the desired level of accuracy (i.e. $R^2$).

In other embodiments, the first predicted pressure may be determined from a pre-determined data set comprising a pressure model. The pressure model may be based on the SP Polynomial or the DP Polynomial, or another truncated form of the polynomials. The pressure model may be stored in memory and the predicted pressure may be determined by correlating one or more parameters of the first operating condition of the compressor unit 102 with the stored estimated value of the first predicted pressure.

In a third step 206, the first controller 106 generates a first operating signal. The first operating signal may comprise a control command sent to the inverter 104 to adjust the speed of the compressor unit 102 for adjustment of the heating or cooling function of the HVAC system 1000, including adjustment of the capacity of the compressor unit 102. In some embodiments, the control command is sent to the inverter 104 which processes and adjusts the voltage.

In other embodiments, the first operating signal may comprise a command to store, display, or communicate the predicted pressure. In some embodiments, as shown in FIG. 2, the predicted pressure may be stored in a memory log 112 operationally connected to the controller 106. The predicted pressure may be sent to a display 114. For example, a diagnostician may be connected to a port operationally connected to the controller and may request a reading of the predicted pressure, or may access the memory log 112 that contains a history of the predicted pressure for a given time period.

The predicted pressure may also be communicated via a communication device 116, as shown in FIG. 2. In some embodiments, the communication device 116 comprises a wireless transceiver and antenna configured to communicate via a wireless network, such as Wi-Fi® (a trademark of Wi-Fi Alliance, Austin, Tex., USA), Bluetooth® (a trademark of Bluetooth SIG, Kirkland Wash., USA), Radio Frequency Identification (RFID), cellular (for example third generation mobile technology (3G), fourth generation mobile technology (4G), and 3GPP Long Term Evolution (LTE)) or other wireless communication protocols or wireless technology standards suitable and known to persons of ordinary skill in the art. The predicted pressure may be sent to the owner, as an alert, or to the manufacturer or service agent for diagnostic purposes, or to another pre-determined third party or device.

Having thus described the present invention by reference to certain of its preferred embodiments, it is noted that the embodiments disclosed are illustrative rather than limiting in nature and that a wide range of variations, modifications, changes, and substitutions are contemplated in the foregoing disclosure and, in some instances, some features of the present invention may be employed without a corresponding use of the other features. Many such variations and modifications may be considered desirable by those skilled in the art based upon a review of the foregoing description of preferred embodiments. Accordingly, it is appropriate that the appended claims be construed broadly and in a manner consistent with the scope of the invention.

The invention claimed is:

1. A control system for a compressor assembly of an heating, ventilation, and air conditioning (HVAC) system, the control system comprising:
   a control assembly configured to operationally connect to a compressor assembly of an HVAC system, wherein the control assembly is configured to vary a capacity of a compressor unit of the compressor assembly;
   wherein the control assembly comprises a controller configured to vary the input power delivered to the compressor unit;
   wherein the controller is configured to:
      determine, when the compressor unit is operating in a first operating state in the HVAC system, a power factor ratio, an input voltage, and an input current of the compressor unit, the power factor ratio being a ratio of power delivered to the compressor unit relative to power consumed by the compressor unit;
      determine, based on the power factor ratio, the input voltage, and the input current of the first operating state, a power of the compressor;
      determine a pressure of the compressor unit operating in the first operating state, wherein the pressure of the compressor unit is determined by calculating the pressure of the compressor unit as a function of the power of the compressor, outdoor temperature, indoor temperature, and indoor airflow rate; and
      determine, based on the pressure of the compressor unit, that there is a problem with the compressor unit.

2. The control system of claim 1, wherein the pressure of the compressor unit is selected from a suction pressure and a discharge pressure of the compressor unit.

3. The control system of claim 1, wherein the controller generates an operating signal based on the pressure of the compressor unit.

4. The control system of claim 3, wherein the operating signal generated by the controller is a command configured to vary the capacity of the compressor assembly from a first capacity of the first operating state to a second capacity of a second operating state.

5. The control system of claim 4, wherein varying the capacity of the compressor assembly from the first capacity of the first operating state to the second capacity of a second operating state comprises varying the input power delivered to the compressor unit.

6. The control system of claim 3, wherein the operating signal generated by the controller is a command configured to store, display, or communicate a predicted pressure.

7. The control system of claim 3, wherein the control assembly further comprises:
   an electrical power converter operationally connected to the controller, wherein the power converter is configured to adjust the input power to the compressor unit; and
   wherein the controller is configured to determine the first operating state based on information received from the electrical power converter.

8. The control system of claim 7, wherein electrical power converter comprises an inverter configured to drive the compressor unit.

9. The control system of claim 1, wherein the pressure of the compressor unit is further calculated as a function of indoor supply air temperature.

10. A method for controlling operation of a compressor assembly of a heating, ventilation, and air conditioning (HVAC) system, the method comprising:
    providing a control assembly configured to operationally connect to a compressor assembly of an HVAC system, wherein the control assembly is configured to vary a capacity of a compressor unit of the compressor assembly;
    determining, when the compressor unit is operating in a first operating state in the HVAC system, a power factor ratio, an input voltage, and an input current, the power factor ratio being a ratio of power delivered to the compressor unit relative to power consumed by the compressor unit;
    determining, based on the power factor ratio, the input voltage, and the input current of the first operating state, a power of the compressor;
    determining a pressure of the compressor unit operating in the first operating state, wherein the pressure of the compressor unit is determined by calculating the pressure of the compressor unit as a function of the power of the compressor, outdoor temperature, indoor temperature and indoor airflow rate; and
    determining, based on the pressure of the compressor unit, that there is a problem with the compressor unit.

11. The method of claim 10, wherein the pressure of the compressor unit is selected from a suction pressure and a discharge pressure of the compressor unit.

12. The method of claim 10, further comprising generating, by the controller, an operating signal based on the pressure of the compressor unit.

13. The method of claim 11, wherein the operating signal generated by the controller is a command configured to vary the capacity of the compressor assembly from a first capacity of the first operating state to a second capacity of a second operating state.

14. The method of claim 13, wherein varying the capacity of the compressor assembly from the first capacity of the first operating state to the second capacity of a second operating state comprises varying the input power delivered to the compressor unit.

15. The method of claim 12, wherein the operating signal generated by the controller is a command configured to store, display, or communicate the predicted pressure.

16. The method of claim 12, further comprising:
providing an electrical power converter operationally connected to the controller, wherein the power converter is configured to adjust the input power to the compressor unit; and
determining, by the controller, the first operating state of the compressor unit based on information received from the electrical power converter.

17. The method of claim 10, wherein
the pressure of the compressor unit is further calculated as a function of indoor supply air temperature.

* * * * *